United States Patent
Yamazaki

(10) Patent No.: US 8,425,380 B2
(45) Date of Patent: Apr. 23, 2013

(54) ENGINE CONTROLLING APPARATUS FOR MOTORCYCLE

(75) Inventor: Katsutoshi Yamazaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 224 days.

(21) Appl. No.: 13/071,740

(22) Filed: Mar. 25, 2011

(65) Prior Publication Data

US 2011/0245037 A1     Oct. 6, 2011

(30) Foreign Application Priority Data

Mar. 31, 2010   (JP) ................................. 2010-084012

(51) Int. Cl.
*B60W 10/06* (2006.01)
*B60W 10/18* (2012.01)

(52) U.S. Cl.
USPC .......................................... 477/204; 477/205

(58) Field of Classification Search .................. 477/186, 477/199, 204, 205, 206, 207
See application file for complete search history.

(56) References Cited

U.S. PATENT DOCUMENTS

| | | | | |
|---|---|---|---|---|
| 5,439,429 A | * | 8/1995 | Lee | 477/207 |
| 6,095,294 A | * | 8/2000 | McGourthy et al. | 188/166 |
| 6,898,506 B2 | * | 5/2005 | Kawai et al. | 701/84 |

FOREIGN PATENT DOCUMENTS

JP     6-247188 A     9/1994

* cited by examiner

*Primary Examiner* — Edwin A Young
(74) *Attorney, Agent, or Firm* — Birch, Stewart, Kolasch & Birch, LLP

(57) ABSTRACT

An engine controlling apparatus for a motorcycle for reducing the output power of the engine when necessary includes a second controller for deciding, if a brake operation is detected based on an opening value of an accelerator grip detected by a potentiometer for detecting an opening value of the accelerator grip that the accelerator grip is in an open state, whether it is necessary to reduce the output power of an engine and for carrying out output power reduction control of the engine. If a front wheel brake sensor detects a brake operation for the front wheel and in addition it is decided from the speed value detected by a vehicle speed sensor that the motorcycle is not being decelerated, then the second controller decides that there is the necessity to reduce the output power of the engine and carries out the output power reduction control of the engine.

20 Claims, 2 Drawing Sheets

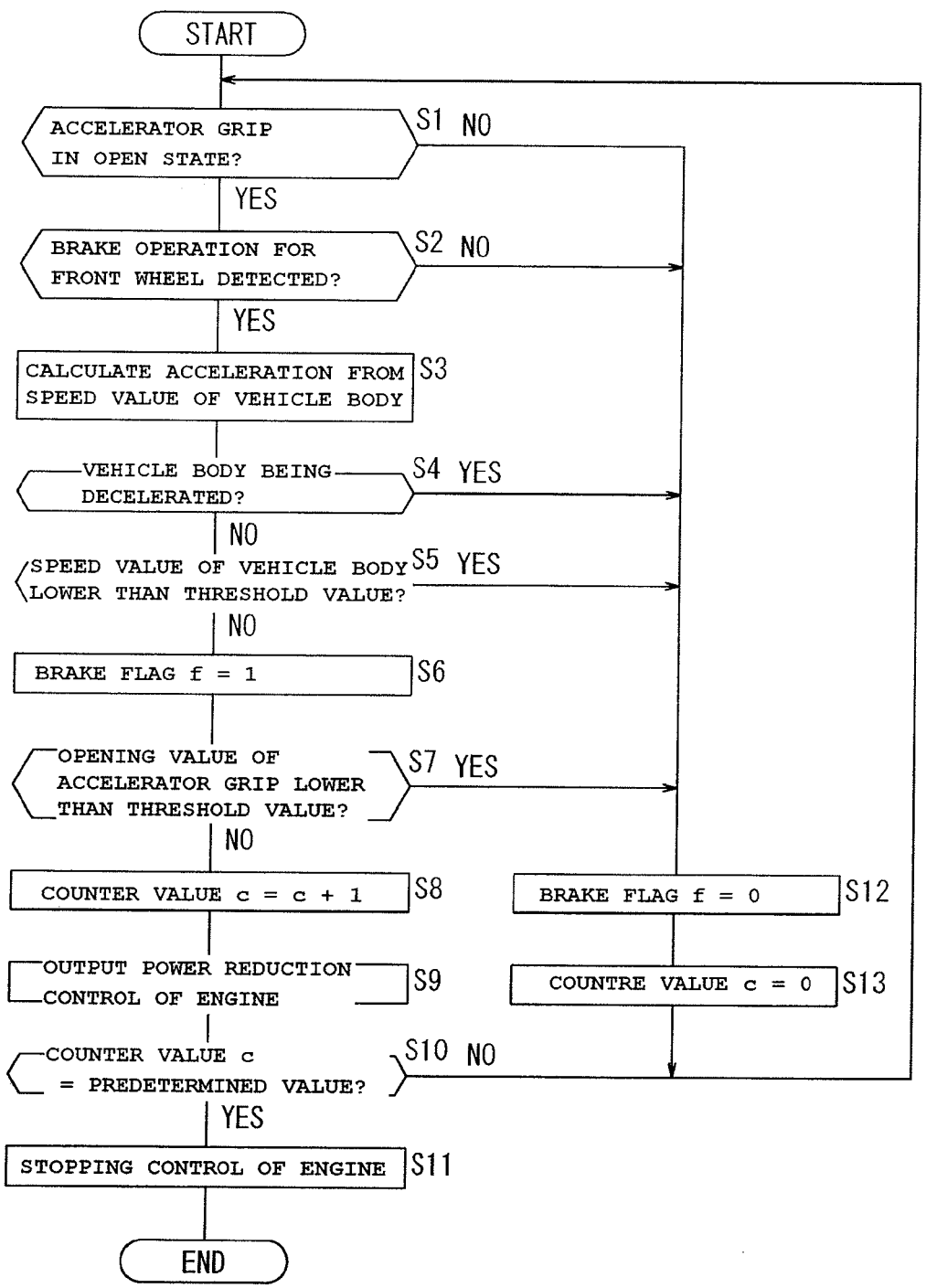

ENGINE CONTROLLING APPARATUS FOR MOTORCYCLE

CROSS-REFERENCE TO RELATED APPLICATIONS

The present application claims priority under 35 USC 119 to Japanese Patent Application No. 2010-084012 filed on Mar. 31, 2010 the entire contents of which are hereby incorporated by reference.

BACKGROUND OF THE INVENTION

1. Field of the Invention

This invention relates to an engine controlling apparatus for a motorcycle which controls an engine of the motorcycle when abnormal operation occurs.

2. Description of Background Art

In Japanese Patent Laid-Open No. Hei 6-247188, a vehicle of the drive-by-wire (DBW) type is disclosed wherein if a brake operation is detected, then the operational amount of the brake operation is detected and the range of the control amount of an actuator for driving a throttle valve is controlled in response to the operational amount of the brake operation. As a result, even in such a case wherein an accelerator opening sensor fails and such a signal which represents that an accelerator pedal is operated to a fully opening position is detected and consequently a throttle valve is opened fully, abnormal traveling can be prevented by strongly operating the brake pedal.

However, according to the technical idea disclosed in Japanese Patent Laid-Open No. Hei 6-247188, the detection means for detecting the operational amount of the brake is required, and the structure is complicated. A high cost is required in comparison with an ordinary brake switch (switch for detecting whether or not the brake is operated).

SUMMARY AND OBJECTS OF THE INVENTION

Therefore, the present invention has been made in view such a problem of the prior art described above. It is an object of an embodiment of the present invention to provide an engine controlling apparatus for a motorcycle which can reduce the output power of the engine when it is necessary to reduce the output power of the engine at a low cost by a simple and easy structure.

In order to achieve the object described above, according to an embodiment of the present invention, an engine controlling apparatus (10) for a motorcycle includes an accelerator opening detection means (26) for detecting an opening value of an accelerator grip (12) and a reduction control section (38) for deciding, if a brake operation is detected when it is decided from the opening value detected by the accelerator opening detection means (26) that the accelerator grip (12) is in an open state, whether it is necessary to reduce the output power of an engine (20) to carry out an output power reduction control of the engine (20). The engine controlling apparatus (10) for a motorcycle further includes brake operation detection means (34) for detecting a brake operation for a front wheel, and vehicle speed detection means (36) for detecting a speed value of the motorcycle. The reduction control section (38) decides when the brake operation detection means (34) detects a brake operation for the front wheel. In addition, if it is decided from the speed value detected by the vehicle speed detection means (36) that the motorcycle is not being decelerated. Thereafter, if there is the necessity to reduce the output power of the engine (20) the control apparatus carries out the output power reduction control of the engine (20).

According to an embodiment of the present invention, the engine controlling apparatus (10) for a motorcycle in the case where the speed value detected by the vehicle speed detection means (36) is lower than a threshold value, the reduction control section (38) decides that there is no necessity to reduce the output power of the engine (20) and does not carry out the output power reduction control of the engine (20).

According to an embodiment of the present invention, the engine controlling apparatus (10) for a motorcycle in the case where the opening value of the accelerator grip (12) detected by the accelerator opening detection means (26) is lower than a threshold value, the reduction control section (38) decides that there is no necessity to reduce the output power of the engine (20) and does not carry out the output power reduction control of the engine (20).

According to an embodiment of the present invention, the engine controlling apparatus (10) for a motorcycle in the case where the reduction control section (38) controls, as the output power reduction control of the engine (20), the speed of the engine (20) so as to be equal to an idling speed and, if the control of the idling speed continues for a fixed period of time, carries out a stopping control of the engine (20).

According to an embodiment of the present invention, the engine controlling apparatus (10) for a motorcycle further includes a driving control section (14) separate from the reduction control section (38); a fuel injection apparatus (22) for injecting fuel into air taken in the engine (20) to produce air fuel mixture; and an ignition apparatus (24) for igniting the air fuel mixture taken in the engine (20), wherein the driving control section (14) controls the fuel injection apparatus (22), ignition apparatus (24) and a throttle valve (18) to drive the engine (20), and wherein the reduction control section (38) controls the fuel injection apparatus (22), ignition apparatus (24) and throttle valve (18) to carry out the output power reduction control of the engine (20).

According to an embodiment of the present invention, in the case where the accelerator grip is in an open state and a brake operation for the front wheel is not carried out, the possibility that the accelerator system may not suffer from abnormality is high. This case is excluded from an object of the output power reduction control of the engine. Therefore, even if an operation of turning the accelerator grip in the opening direction to start up on an incline while the brake is being applied to the rear wheel, the output power reduction control of the engine is not carried out unnecessarily. Therefore, the driving of the motorcycle is not disturbed.

Further, even if a brake operation for the front wheel is carried out in a state in which the accelerator grip is open, if the vehicle body is decelerating, then the possibility that the accelerator system may not suffer from abnormality is high. This case is excluded from an object of the output power reduction control of the engine. Therefore, even if, when the motorcycle comes to a corner, driving (so-called blipping) wherein the accelerator grip is operated in the opening direction while the brake is being applied to the front and rear wheels, is carried out, the output power reduction control of the engine is not carried out unnecessarily. Therefore, the driving of the motorcycle is not disturbed.

Further, since it is decided based on detection results of the vehicle speed detection means usually provided on the motorcycle and the brake operation detection means for detecting a brake operation for the front wheel whether or not the output power reduction control of the engine should be carried out. Therefore, when necessary, the output power reduction control of the engine can be carried out using the existing detection means without providing detection means for detecting the operation amount of the brake which is complicated and expensive.

According to an embodiment of the present invention, even if a brake operation for the front wheel is carried out while the accelerator grip is in an open state, in the case where the speed value of the vehicle body is lower than the threshold value, the possibility that the accelerator system may not suffer from abnormality is high, and this case is excluded from an object of the output power reduction control of the engine. Therefore, even in the case where starting up on an incline is carried out while the brake is applied to the front wheel, the output power reduction control of the engine is not carried out unnecessarily, and consequently, the driving of the motorcycle is not disturbed.

According to an embodiment of the present invention, even if a brake operation for the front wheel is carried out while the accelerator grip is in an open state, in the case where the opening value of the accelerator grip is lower than the threshold value, the motorcycle can be decelerated by the brake operation for the front wheel. Therefore, the output power reduction control of the engine is not carried out unnecessarily, and flexibility can be provided to driving by the rider.

According to an embodiment of the present invention, in the case where the accelerator system is free from abnormality, even if the output power reduction control of the engine is started depending upon a driving situation of the rider, the engine speed can be returned quickly.

According to an embodiment of the present invention, in the case where the driving control section for carrying out normal driving control is provided, even if the driving control section fails, the output power reduction control of the engine can be carried out with certainty.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a flow chart illustrating operation of a second controller shown in FIG. 1.

DETAILED DESCRIPTION OF THE PREFERRED EMBODIMENTS

Figure 1:
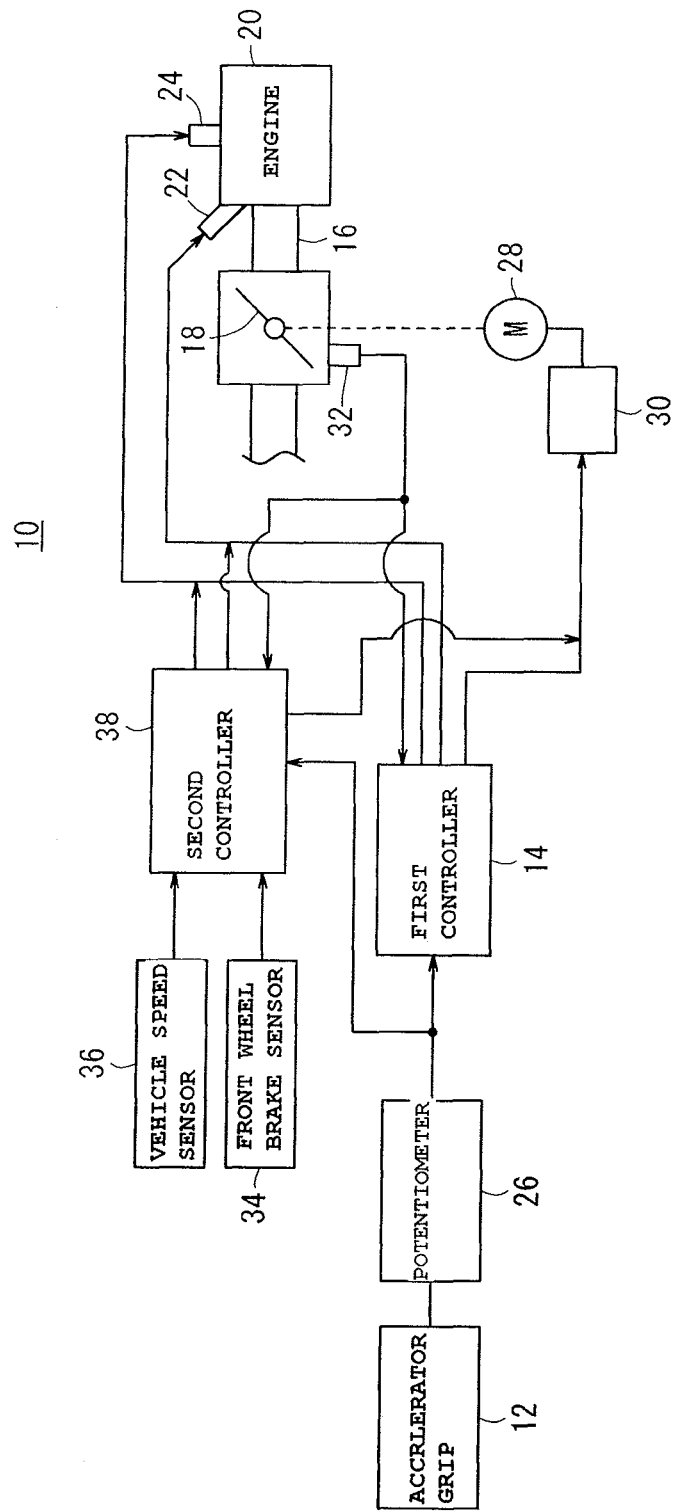
FIG. 1 is a block diagram of an engine controlling apparatus for a motorcycle incorporated in a motorcycle of the drive-by-wire type (including a motorized bicycle)

An engine controlling apparatus for a motorcycle according to the present invention is described in detail below in connection with a preferred embodiment thereof with reference to the accompanying drawings.

FIG. 1 is a block diagram of an engine controlling apparatus 10 for a motorcycle incorporated in a motorcycle of the drive-by-wire type (including a motorized bicycle).

The engine controlling apparatus 10 for a motorcycle includes an accelerator grip 12, a first controller (driving control section) 14, a throttle valve 18 provided for an intake pipe 16, an engine 20, an injector (fuel injection system) 22 for injecting fuel into air taken in a combustion chamber not shown of the engine 20, and an ignition plug (ignition apparatus) 24 for igniting the air fuel mixture in the fuel chamber.

The injector 22 injects fuel into air taken in the combustion chamber through the throttle valve 18 for adjusting the intake air amount into the combustion chamber to produce an air fuel mixture. If the produced air fuel mixture is introduced into the combustion chamber of the engine 20 and the air fuel mixture ignited by the ignition plug is exploded, then the engine 20 converts the energy of the explosion into power.

The accelerator grip 12 is provided on a handle bar of the motorcycle not shown and has a structure in which it can be turned by a rider. The accelerator grip 12 is biased in a fully closing direction by a return spring not shown, and when force in an opening direction is not applied to the accelerator grip 12 by the rider, the accelerator grip 12 returns to the fully closing position. The first controller 14 controls the opening and closing of the throttle valve 18, the injection timing and injection time of the injector 22 and the ignition timing of the ignition plug 24 in response to turning motion of the accelerator grip 12. In short, the first controller 14 controls the throttle valve 18, injector 22 and ignition plug 24 in response to the turning motion of the accelerator grip 12 to drive the engine 20.

A potentiometer (accelerator opening detection means) 26 detects the opening value of the accelerator grip 12. If the rider wants to accelerate, then the rider would turn the accelerator grip 12 in the opening direction, but if the rider wants to decelerate, then the rider would turn the accelerator grip 12 in the closing direction.

The throttle valve 18 is biased to a fully closed position by a return spring not shown. A motor 28 adjusts the opening of the throttle valve 18 and is driven by a driver 30. In the case where driving of the motor 28 stops, the throttle valve 18 returns to the fully closed position by the return spring described above.

The first controller 14 controls the driver 30 in response to the opening value detected by the potentiometer 26 to control the opening of the throttle valve 18. In the present embodiment, in order to facilitate a better understanding, the opening of the throttle valve 18 is controlled so as to have an opening value equal to the opening value of the accelerator grip 12.

A throttle valve opening sensor (throttle opening detection means) 32 detects the opening of the throttle valve 18, and the first controller 14 uses the detected opening value of the throttle valve 18 to control the driver 30 so that the opening of the throttle valve 18 becomes equal to the opening value of the accelerator grip 12. In short, the first controller 14 controls the throttle valve 18 until the detected opening value of the throttle valve 18 becomes equal to the opening value of the accelerator grip 12.

The engine controlling apparatus 10 for a motorcycle further includes a front wheel brake sensor (brake operation detection means) 34 for detecting whether or not a brake lever not shown for braking the front wheel of the motorcycle is operated, a vehicle speed sensor (vehicle speed detection means) 36 for detecting the vehicle body speed of the motorcycle, and a second controller (reduction control section) 38 for deciding, if the brake lever is operated when the accelerator grip 12 is in an open state, whether or not it is necessary to reduce the output power of the engine 20 and carrying out output power reduction control of the engine 20.

The front wheel brake sensor 34 and the vehicle speed sensor 36 output detected signals to the second controller 38. The second controller 38 decides based on detection results of the front wheel brake sensor 34 and the vehicle speed sensor 36 whether or not the output power of the engine 20 should be reduced. The second controller 38 controls the throttle valve 18, injector 22 and ignition plug 24 to carry out output power reduction control of the engine 20. It is to be noted that the motorcycle includes a brake pedal not shown for braking the rear wheel and a rear wheel brake sensor not shown for detecting whether or not the brake pedal is operated.

If the potentiometer 26 fails or the accelerator grip 12 sticks and does not return to the fully closed position (in the case where abnormality occurs with the acceleration system), then there is the possibility that the opening of the throttle valve 18 may be controlled by the first controller 14 so that it may become equal to the opening value outputted from the potentiometer 26 and a speed which is not intended by the rider may be established. In the case where such abnormality of the acceleration system occurs and the motorcycle travels abnormally, even if a brake operation is carried out, if the vehicle body cannot be slowed down or stopped, then the second controller 38 carries out output power reduction control of the engine 20.

Now, the operation of the second controller 38 is described with reference to a flow chart of FIG. 2. The second controller 38 decides based on the opening value detected by the potentiometer 26 whether or not the accelerator grip 12 is an open state (step S1).

If it is decided at step S1 that the accelerator grip 12 is in an open state, then it is decided based on an output signal of the front wheel brake sensor 34 whether or not a brake operation for the front wheel is carried out (step S2). It is to be noted that the second controller 38 may carry out the decision at step S2 before the decision at step S1 or may carry out the decision at step S1 and the decision at step S2 in parallel to each other.

If it is decided at step S2 that a brake operation for the front wheel is carried out, then the acceleration of the vehicle body is calculated from the speed value detected by the vehicle speed sensor 36 (step S3). In particular, the calculation is carried out from a speed value detected in the past (detected, for example, in the preceding cycle or in a cycle prior by fixed time) and a speed value detected latest.

Then, it is decided from the acceleration calculated at step S3 whether or not the vehicle body is being decelerated (step S4). If it is decided that the vehicle speed is not being decelerated, then it is decided whether or not the speed value of the vehicle body detected latest is lower than a threshold value (step S5).

If it is decided at step S5 that the speed value of the vehicle body decided latest is not lower than the threshold value, then there is the possibility that the accelerator system may suffer from some abnormality, and it is decided that there is the necessity to reduce the output power of the engine 20. Then, "1" is placed into a brake flag f, that is, the brake flag f is set (step S6), whereafter the processing advances to step S7. It is to be noted that, in the case where the brake flag f already is "1," then the processing advances directly to step S7. In the state in which the brake flag f is "1," the operation illustrated in the flow chart of FIG. 2 is carried out most preferentially for all programs to be executed by the first controller 14 and the second controller 38.

After the processing advances to step S7, it is decided whether or not the opening value of the accelerator grip 12 is lower than a threshold value. In short, it is decided whether or not the opening value detected by the potentiometer 26 is lower than the threshold value. The threshold value used at step S7 may be different from the threshold value used at step S5.

If it is decided at step S7 that the opening value detected by the potentiometer 26 is not lower than the threshold value, then a counter value c is incremented, that is, increased by 1 (step S8), and then the processing advances to step S9. After the processing advances to step S9, output power reduction control of the engine 20 is carried out. In particular, the injector 22, ignition plug 24 and throttle valve 18 are controlled to control the speed of the engine 20 so as to be equal to a predetermined speed (for example, to an idling speed). The second controller 38 controls the injection timing and injection time of fuel by the injector 22, the ignition timing of the ignition plug 24 and the opening of the throttle valve 18 to reduce the output power of the engine 20. The second controller 38 may issue a notification that the output power reduction control of the engine 20 is being carried out to the rider. For example, the second controller 38 may turn on an indicator of a meter for displaying the speed of the vehicle body to notify the rider that the output power reduction control of the engine 20 is being carried out.

Then, it is decided whether or not the counter value c at present is equal to a predetermined value (step S10). In short, it is decided whether or not a fixed period of time elapses after the brake flag f is set to "1." It is to be noted that, if the brake flag f changes from "0" to "1," then the timer may be started to decide whether or not the fixed period of time elapses. If it is decided at step S10 that the counter value c at present is not equal to the predetermined value, then the processing returns to step S1, but if it is decided that the counter value c at present is equal to the predetermined value, then stopping control of the engine 20 is carried out (step S11).

As the stopping control of the engine 20, the throttle valve 18, injector 22 and ignition plug 24 are controlled to stop the engine 20. For example, the engine 20 can be stopped by stopping the driving of the motor 28 to return the throttle valve 18 to the fully closed position. Or, it is possible to stop the engine 20 by stopping the injection of fuel by the injector 22. Further, it is possible to stop the engine 20 by stopping the ignition by the ignition plug 24.

On the other hand, when it is decided at step S1 that the accelerator grip 12 is not in an open state, when it is decided at step S2 that a brake operation for the front wheel is not detected, when it is decided at step S4 that the vehicle body is being decelerated, when it is decided at step S5 that the speed value is lower than the threshold value or when it is decided at step S7 that the opening of the accelerator grip 12 is lower than the threshold value, it is decided that there is no necessity to reduce the output power of the engine 20. Thus, the brake flag f is changed to "0" (step S12) and the counter value c is changed to "0," that is, the counter value is reset (step S13), whereafter the processing returns to step S1.

The reason why, even if the accelerator grip 12 is in an open state (Yes at step S1), as long as a brake operation for the front wheel is not detected (No at step S2), the processing advances to step S12 is that, in such an instance, the possibility that the accelerator system may not suffer from abnormality is high and it is intended to except such an instance from an object of the output power reduction control of the engine 20. For example, upon starting up on an incline, usually the rider would carry out a brake operation for the rear wheel and turn the accelerator grip 12 in the opening direction. In such an instance as just described, if the output power reduction control of the engine 20 is carried out, then this will disturb the operation for the starting up on an incline.

Further, the rider sometimes carries out, upon shifting down, a so-called blipping operation of gunning of the engine through the accelerator while carrying out a brake operation for the front wheel and the rear wheel. At this time, usually the speed of the vehicle body is decreasing. Accordingly, even if the accelerator grip 12 is in an open state and a brake operation for the front wheel is carried out, if the vehicle body is being decelerated (Yes at step S4), then the possibility that the accelerator system may not suffer from abnormality is high. Thus, in order to eliminate this case from an object of the output power reduction control of the engine 20, the processing advances to step S12.

Further, even if the accelerator grip 12 is in an open state and a brake operation for the front wheel is carried out, if the speed value of the vehicle body is lower than the threshold value (for example, 5 km/h) (yes at step S5), then the possibility that the accelerator system may not suffer from abnormality is high, and this case is excluded from an object of the output power reduction control of the engine 20. For example, depending upon the rider, upon starting up on an incline, a brake operation for the front wheel is sometimes carried out in place of a brake operation for the rear wheel. Such an instance as just described is excluded from an object of the output power reduction control of the engine 20. It is to be noted that, since it is considered that, upon starting up on an incline, the brake operation for the front wheel is stopped before the speed value of the vehicle body becomes higher than the threshold value, the exclusion is limited only to a case in which the speed value of the vehicle is lower than the threshold value.

On the other hand, the reason why, even if it is decided at step S5 that the speed value of the vehicle body is not lower than the threshold value, if the opening value of the accelerator grip 12 is lower than the threshold value (Yes at step S7), then the processing advances to step S12 is that, even if the possibility that the acceleration system may suffer from abnormality is high, since the braking force of a braking operation is higher than the driving force which depends upon the output power of the engine 20, there is no necessity to compulsorily carry out the output power reduction control of the engine 20. In this instance, two cases are available including a case in which a braking operation for the front wheel is carried out while the accelerator grip 12 is turned in the opening direction by a will of the rider and another case in which, since a speed which is not intended by the rider is exhibited from abnormality of the accelerator system (failure of the potentiometer 26, sticking of the accelerator grip 12), the rider carries out a brake operation for the front wheel intending to stop the vehicle body. However, if the opening value of the accelerator grip 12 is lower than the threshold value, since the vehicle body can be decelerated or stopped by a brake operation for the front wheel, the output power reduction control of the engine 20 is not carried out compulsorily. Consequently, it is possible to provide flexibility to driving of the rider.

Since stopping control of the engine 20 is not carried out until a fixed interval of time elapses (until the counter value c becomes equal to the predetermined value) after the brake flag changes to "1," even if the output power reduction control of the engine 20 is started depending upon an operation situation of the rider, if the driving state of the vehicle returns to an ordinary state, then the engine speed can be returned immediately. This is because it is difficult to consider that the driving situation in which the output power reduction control of the engine 20 is carried out continues for a period of time longer than the fixed time if the acceleration system is not abnormal.

Since the first controller 14 carries out ordinary driving control and the second controller 38 is a control section for exclusive use for executing operation for executing the output power reduction control (operation indicated by the flow chart of FIG. 2), even if the first controller 14 fails, abnormal traveling can be prevented by the second controller 38.

It is to be noted that, when it is decided at step S4 that the vehicle body is not being decelerated, the processing may advance directly to step S6 to set the brake flag f to "1," whereafter the processing advances to step S8. In this instance, the operation at steps S5 and S7 is unnecessary. In short, if a brake operation for the front wheel is carried out and the vehicle body is not being decelerated while the accelerator grip 12 is in an open state, then the output power reduction control of the engine 20 is carried out.

Further, if it is decided at step S5 that the speed value of the vehicle body is not lower than the threshold value, the brake flag f may be set to "1" at step S6, whereafter the processing advances to step S8. In this instance, the operation at step S7 is unnecessary. In short, in the case where a brake operation is carried out while the accelerator grip 12 is in an open state and the vehicle body is not decelerated and besides the speed value of the vehicle body is not lower than the threshold value, the output power reduction control of the engine 20 is carried out.

Further, when it is decided at step S4 that the vehicle body is not being decelerated, the processing may advance directly to step S6 to set the brake flag f to "1," whereafter the processing advances to step S7. In this instance, the operation at step S5 is unnecessary. In short, in the case where a brake operation for the front wheel is carried out while the accelerator grip 12 is in an open state and the vehicle body is not decelerated and besides the opening value of the accelerator grip 12 is not lower than the threshold value, the output power reduction control of the engine 20 is carried out.

Further, a different mode may be adopted in which any operation which is considered unnecessary from among the operation at step S3 and step S4, operation at step S5 and operation at step S7 is deleted arbitrarily from the flow chart illustrated in FIG. 2.

Further, while, at step S7, it is decided whether or not the opening value of the accelerator grip 12 is lower than the threshold value, it may otherwise be decided whether or not the opening value of the throttle valve 18 is lower than a threshold value. In this instance, if the opening value of the throttle valve 18 is not lower than the threshold value, then the processing advances to step S8, but if the opening value of the throttle valve 18 is lower than the threshold value, then the processing advances to step S12.

Further, while the foregoing description of the embodiment is given based on an assumption of an engine controlling apparatus for a motorcycle in a motorcycle of the drive-by-wire (DBW) type, the present invention can be applied also to a motorcycle of the type wherein the accelerator grip 12 and the throttle valve 18 are connected to each other by a wire.

Although the present invention has been described in connection with the preferred embodiment thereof, the technical scope of the present invention is not limited to the scope of the description of the embodiment described above. It is apparent to those skilled in the art that it is possible to apply various alterations or improvements to the embodiment described above. It is apparent from the description of the claims that also modes to which such alterations or improvements are applied can be included in the technical scope of the present invention. Further, the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine controlling apparatus for a motorcycle which includes accelerator opening detection means for detecting an opening value of an accelerator grip, and a reduction control section for deciding, if a brake operation is detected when it is decided from the opening value detected by said accelerator opening detection means that said accelerator grip is in an open state, whether it is necessary to reduce the output power of an engine and carrying out output power reduction control of said engine comprising:
brake operation detection means for detecting a brake operation for a front wheel; and
vehicle speed detection means for detecting a speed value of the motorcycle;
wherein said reduction control section decides, when said brake operation detection means detects a brake operation for the front wheel and in addition it is decided from the speed value detected by said vehicle speed detection means that the motorcycle is not being decelerated, that there is a necessity to reduce the output power of the engine and carries out the output power reduction control of the engine.

2. The engine controlling apparatus for the motorcycle according to claim 1, wherein in the case where the speed value detected by said vehicle speed detection means is lower than a threshold value, said reduction control section decides that there is no necessity to reduce the output power of said engine and does not carry out the output power reduction control of said engine.

3. The engine controlling apparatus for the motorcycle according to claim 2, wherein said reduction control section controls, as the output power reduction control of said engine, the speed of said engine so as to be equal to an idling speed and, if the control of the idling speed continues for a fixed period of time, carries out stopping control of said engine.

4. The engine controlling apparatus for the motorcycle according to claim 2, wherein said engine controlling apparatus for the motorcycle further comprises:
a driving control section separate from said reduction control section;
a fuel injection apparatus for injecting fuel into air taken in said engine to produce an air fuel mixture; and
an ignition apparatus for igniting the air fuel mixture taken in said engine;
wherein said driving control section controls said fuel injection apparatus, ignition apparatus and a throttle valve to drive said engine, and
wherein said reduction control section controls said fuel injection apparatus, ignition apparatus and throttle valve to carry out the output power reduction control of said engine.

5. The engine controlling apparatus for the motorcycle according to claim 1, wherein in the case where the opening value of said accelerator grip detected by said accelerator opening detection means is lower than a threshold value, said reduction control section decides that there is no necessity to reduce the output power of said engine and does not carry out the output power reduction control of said engine.

6. The engine controlling apparatus for the motorcycle according to claim 5, wherein said reduction control section controls, as the output power reduction control of said engine, the speed of said engine so as to be equal to an idling speed and, if the control of the idling speed continues for a fixed period of time, carries out stopping control of said engine.

7. The engine controlling apparatus for the motorcycle according to claim 5, wherein said engine controlling apparatus for the motorcycle further comprises:
a driving control section separate from said reduction control section;
a fuel injection apparatus for injecting fuel into air taken in said engine to produce an air fuel mixture; and
an ignition apparatus for igniting the air fuel mixture taken in said engine;
wherein said driving control section controls said fuel injection apparatus, ignition apparatus and a throttle valve to drive said engine, and
wherein said reduction control section controls said fuel injection apparatus, ignition apparatus and throttle valve to carry out the output power reduction control of said engine.

8. The engine controlling apparatus for the motorcycle according to claim 1, wherein said reduction control section controls, as the output power reduction control of said engine, the speed of said engine so as to be equal to an idling speed and, if the control of the idling speed continues for a fixed period of time, carries out stopping control of said engine.

9. The engine controlling apparatus for the motorcycle according to claim 8, wherein said engine controlling apparatus for the motorcycle further comprises:
a driving control section separate from said reduction control section;
a fuel injection apparatus for injecting fuel into air taken in said engine to produce an air fuel mixture; and
an ignition apparatus for igniting the air fuel mixture taken in said engine;
wherein said driving control section controls said fuel injection apparatus, ignition apparatus and a throttle valve to drive said engine, and
wherein said reduction control section controls said fuel injection apparatus, ignition apparatus and throttle valve to carry out the output power reduction control of said engine.

10. The engine controlling apparatus for the motorcycle according to claim 1, wherein said engine controlling apparatus for the motorcycle further comprises:
a driving control section separate from said reduction control section;
a fuel injection apparatus for injecting fuel into air taken in said engine to produce an air fuel mixture; and
an ignition apparatus for igniting the air fuel mixture taken in said engine;
wherein said driving control section controls said fuel injection apparatus, ignition apparatus and a throttle valve to drive said engine, and
wherein said reduction control section controls said fuel injection apparatus, ignition apparatus and throttle valve to carry out the output power reduction control of said engine.

11. An engine controlling apparatus adapted to be used with a motorcycle having accelerator opening detection means for detecting an opening value of an accelerator grip, and a reduction control section for deciding, if a brake operation is detected when it is decided from the opening value detected by said accelerator opening detection means that said accelerator grip is in an open state, whether it is necessary to reduce the output power of an engine and carrying out output power reduction control of said engine comprising:
brake operation detection means for detecting a brake operation for a front wheel; and
vehicle speed detection means for detecting a speed value of the motorcycle;

wherein upon detection of a brake operation for the front wheel by the brake operation detection means, and upon detection that the vehicle is not being decelerated by the vehicle speed detection means, a reduction in the output power of the engine is decided and carried out by the output power reduction control of the engine.

12. The engine controlling apparatus adapted to be used with a motorcycle according to claim 11, wherein in the case where the speed value detected by said vehicle speed detection means is lower than a threshold value, said reduction control section decides that there is no necessity to reduce the output power of said engine and does not carry out the output power reduction control of said engine.

13. The engine controlling apparatus adapted to be used with a motorcycle according to claim 12, wherein said reduction control section controls, as the output power reduction control of said engine, the speed of said engine so as to be equal to an idling speed and, if the control of the idling speed continues for a fixed period of time, carries out stopping control of said engine.

14. The engine controlling apparatus adapted to be used with a motorcycle according to claim 12, wherein said engine controlling apparatus for the motorcycle further comprises:
   a driving control section separate from said reduction control section;
   a fuel injection apparatus for injecting fuel into air taken in said engine to produce an air fuel mixture; and
   an ignition apparatus for igniting the air fuel mixture taken in said engine;
   wherein said driving control section controls said fuel injection apparatus, ignition apparatus and a throttle valve to drive said engine, and
   wherein said reduction control section controls said fuel injection apparatus, ignition apparatus and throttle valve to carry out the output power reduction control of said engine.

15. The engine controlling apparatus adapted to be used with a motorcycle according to claim 11, wherein in the case where the opening value of said accelerator grip detected by said accelerator opening detection means is lower than a threshold value, said reduction control section decides that there is no necessity to reduce the output power of said engine and does not carry out the output power reduction control of said engine.

16. The engine controlling apparatus adapted to be used with a motorcycle according to claim 15, wherein said reduction control section controls, as the output power reduction control of said engine, the speed of said engine so as to be equal to an idling speed and, if the control of the idling speed continues for a fixed period of time, carries out stopping control of said engine.

17. The engine controlling apparatus adapted to be used with a motorcycle according to claim 15, wherein said engine controlling apparatus for the motorcycle further comprises:
   a driving control section separate from said reduction control section;
   a fuel injection apparatus for injecting fuel into air taken in said engine to produce an air fuel mixture; and
   an ignition apparatus for igniting the air fuel mixture taken in said engine;
   wherein said driving control section controls said fuel injection apparatus, ignition apparatus and a throttle valve to drive said engine, and
   wherein said reduction control section controls said fuel injection apparatus, ignition apparatus and throttle valve to carry out the output power reduction control of said engine.

18. The engine controlling apparatus adapted to be used with a motorcycle according to claim 11, wherein said reduction control section controls, as the output power reduction control of said engine, the speed of said engine so as to be equal to an idling speed and, if the control of the idling speed continues for a fixed period of time, carries out stopping control of said engine.

19. The engine controlling apparatus adapted to be used with a motorcycle according to claim 18, wherein said engine controlling apparatus for the motorcycle further comprises:
   a driving control section separate from said reduction control section;
   a fuel injection apparatus for injecting fuel into air taken in said engine to produce an air fuel mixture; and
   an ignition apparatus for igniting the air fuel mixture taken in said engine;
   wherein said driving control section controls said fuel injection apparatus, ignition apparatus and a throttle valve to drive said engine, and
   wherein said reduction control section controls said fuel injection apparatus, ignition apparatus and throttle valve to carry out the output power reduction control of said engine.

20. The engine controlling apparatus adapted to be used with a motorcycle according to claim 11, wherein said engine controlling apparatus for the motorcycle further comprises:
   a driving control section separate from said reduction control section;
   a fuel injection apparatus for injecting fuel into air taken in said engine to produce an air fuel mixture; and
   an ignition apparatus for igniting the air fuel mixture taken in said engine;
   wherein said driving control section controls said fuel injection apparatus, ignition apparatus and a throttle valve to drive said engine, and
   wherein said reduction control section controls said fuel injection apparatus, ignition apparatus and throttle valve to carry out the output power reduction control of said engine.

* * * * *